United States Patent [19]

Sasaki et al.

[11] Patent Number: 4,834,132
[45] Date of Patent: May 30, 1989

[54] FUEL TRANSFER APPARATUS

[75] Inventors: Michiaki Sasaki; Junya Ohno; Katsunori Ozaki; Kiyokazu Yamamoto; Toshiyuki Matsuki, all of Kanagawa, Japan

[73] Assignees: Nissan Motor Company, Limited; Jidosha Denki Kogyo Kabushiki Kaisha, both of Yokohama, Japan

[21] Appl. No.: 100,101

[22] Filed: Sep. 23, 1987

[30] Foreign Application Priority Data

Sep. 25, 1986 [JP] Japan ............................... 61-226877
Sep. 26, 1986 [JP] Japan ............................... 61-227218
Feb. 5, 1987 [JP] Japan ............................... 62-25341
Feb. 5, 1987 [JP] Japan ............................... 62-25340

[51] Int. Cl.$^4$ .......................... F04F 5/00; F04F 5/44
[52] U.S. Cl. ................................. 137/143; 137/147; 137/216; 137/571; 417/192; 417/194; 417/198; 123/514
[58] Field of Search ............... 137/142, 143, 147, 216, 137/571, 574, 576, 881, 888; 417/151, 192, 194, 198; 123/514, 516

[56] References Cited

U.S. PATENT DOCUMENTS

| | | | |
|---|---|---|---|
| 1,619,808 | 3/1927 | Bracke | 417/194 |
| 2,171,579 | 9/1939 | Loughridge | 137/147 |
| 2,953,156 | 9/1960 | Bryant | 137/571 X |
| 3,455,324 | 7/1969 | Bieri et al. | 137/216 |
| 3,881,457 | 5/1975 | Benner et al. | 137/574 X |
| 4,503,885 | 3/1985 | Hall | 137/574 |
| 4,595,344 | 6/1986 | Briley | 417/198 X |

FOREIGN PATENT DOCUMENTS

| | | |
|---|---|---|
| 2849461 | 5/1980 | Fed. Rep. of Germany . |
| 197684 | 3/1924 | United Kingdom ............ 417/194 |
| 575024 | 1/1946 | United Kingdom ............ 417/194 |
| 1515800 | 6/1978 | United Kingdom . |

Primary Examiner—John Rivell
Attorney, Agent, or Firm—Foley & Lardner, Schwartz, Jeffery, Schwaab, Mack, Blumenthal & Evans

[57] ABSTRACT

A fuel supply system including a fuel tank, a feed conduit through which fuel is pumped from the fuel tank, and a return conduit through which excess fuel is returned to the fuel tank. The fuel tank has first and second sumps. The system comprises an ejector pump having a pressure chamber opening through a throat into the first sump. The pressure chamber is connected through a communication conduit to the second sump. The ejector pump includes a fuel nozzle having an inlet port connected to the return conduit and a discharge end opening into the pressure chamber for discharging a jet of fuel into the pressure chamber to create a negative pressure in the pressure chamber so as to suck fuel through the communication conduit from the second sump. In one aspect of the invention, a relief valve is provided which is responsive to a back pressure produced in the fuel nozzle for relieving the back pressure to the first sump when the back pressure exceeds a predetermined value. In another aspect of the invention, the fuel nozzle is designed to diffuse the fuel discharged therefrom over the cross-sectional area of the throat. In still another aspect of the invention, the throat has a length and an inner diameter to provide a length-to-diameter ratio ranging from 2 to 8.

19 Claims, 13 Drawing Sheets

FIG. 17
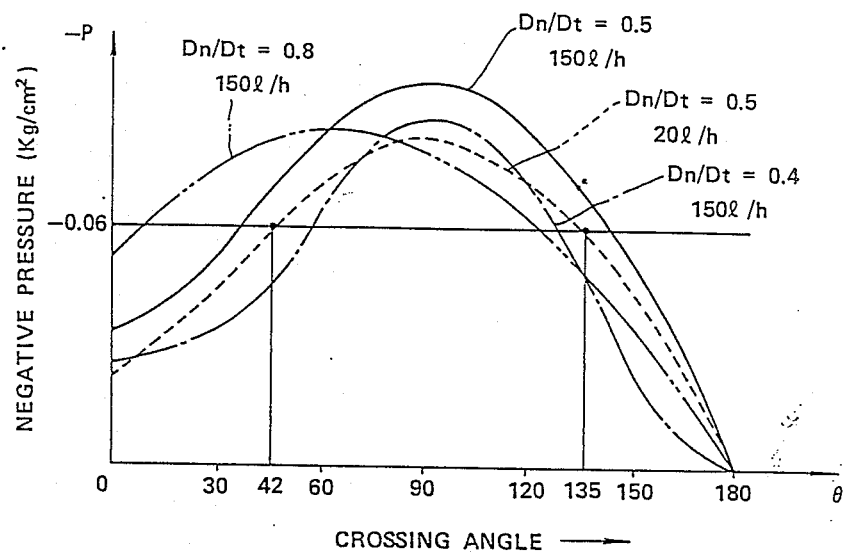
FIG. 19
FIG. 20
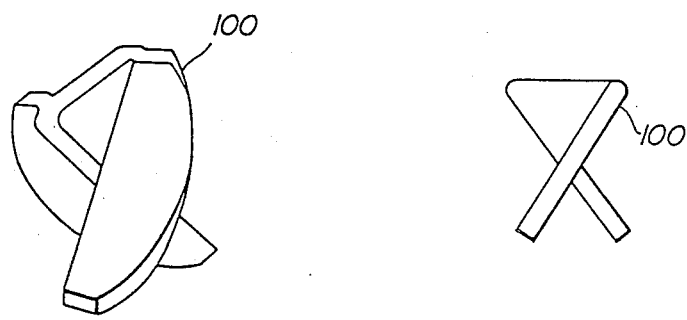

FIG.23   FIG.24   FIG.25
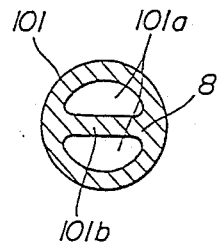
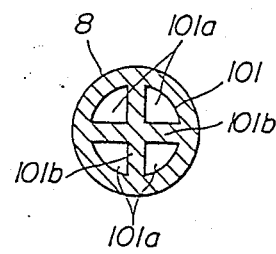
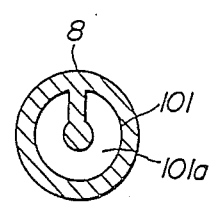
FIG.26
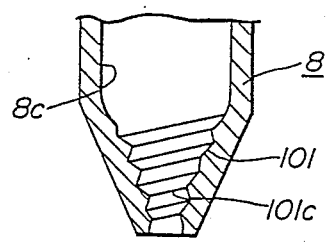

FUEL TRANSFER APPARATUS

BACKGROUND OF THE INVENTION

This invention relates to a fuel transfer apparatus for transferring fuel from one sump to another formed in a fuel tank used in an automotive vehicle.

It has been proposed, for example, in Japanese Utility Model Kokai No. 57-109921 to curve the bottom wall of a fuel tank inwardly so as to form a recess below the fuel tank in order to avoid interference with one or more components positioned in an automotive vehicle. However, this structure has a projection dividing the fuel tank into two separate sumps and requires expensive components to transfer fuel from one sump to another. These components include fuel level sensors, a change-over valve, and a control circuit.

SUMMARY OF THE INVENTION

Therefore, a main object of the invention is to provide a simple and inexpensive fuel transfer apparatus which can transfer fuel from one sump to another with high efficiency.

There is provided, in accordance with the invention, a fuel supply system including a fuel tank, a feed conduit through which fuel is pumped from the fuel tank, and a return conduit through which excess fuel is returned to the fuel tank. The fuel tank has first and second sumps separated from each other. The fuel supply system includes an ejector pump having a pressure chamber opening through a throat into the first sump. The pressure chamber is connected through a communication conduit to the second sump. The ejector pump also includes a fuel nozzle having an inlet port connected to the return conduit and a discharge end opening into the pressure chamber for discharging a jet of fuel into the pressure chamber to create a negative pressure in the pressure chamber so as to suck fuel through the communication conduit from the second sump. The fuel supply system also includes means responsive to a back pressure produced in the fuel nozzel for releasing the back pressure to the first sump when the back pressure exceeds a predetermined value.

In another aspect of the invention, a fuel supply system is provided which includes a fuel tank, a feed conduit through which fuel is pumped from the fuel tank, and a return conduit through which excess fuel is returned to the fuel tank. The fuel tank has first and second sumps separated from each other. The fuel supply system includes an ejector pump having a pressure chamber opening through a throat into the first sump. The pressure chamber is connected through a communication conduit to the second sump. The ejector pump also includes a fuel nozzle having an inlet port connected to the return chamber for discharging a jet of fuel into the pressure chamber to create a negative pressure in the pressure chamber so as to suck fuel through the communication conduit from the second sump. The fuel supply system also includes means for diffusing the discharged fuel over the cross-sectional area of the throat to prevent air introduction through the throat into the pressure chamber.

In another aspect of the invention, a fuel supply system is provided which includes a fuel tank, a feed conduit through which fuel is pumped from the fuel tank, and a return conduit through which excess fuel is returned to the fuel tank. The fuel tank has first and second sumps separated from each other. The fuel supply system includes an ejector pump having a pressure chamber opening through a throat into the first sump. The pressure chamber is connected through a communication conduit to the second sump. The ejector pump also includes a fuel nozzle having an inlet port connected to the return conduit and discharge holes opening into the pressure chamber at an angle with respect to the axis of the fuel nozzle for discharging fuel in the form of a cone-shaped jet into the pressure chamber to create a negative pressure in the pressure chamber so as to suck fuel through the communication conduit from the second sump.

In another aspect of the invention, a fuel supply system is provided which includes a fuel tank, a feed conduit through which fuel is pumped from the fuel tank, and a return conduit through which excess fuel is returned to the fuel tank. The fuel tank has first and second sumps separated from each other. The fuel supply system includes an ejector pump having a pressure chamber opening through a throat into the first sump. The pressure chamber is connected through a communication conduit to the second sump. The ejector pump also includes a fuel nozzle having an inlet port connected to the return conduit and a discharge end opening into the pressure chamber for discharging a jet of fuel into the pressure chamber to create a negative pressure in the pressure chamber so as to suck fuel through the communication conduit from the second sump. The fuel nozzle has an inner surface formed with a swirled groove for swirling fuel in the fuel nozzle.

In another aspect of the invention, a fuel supply system is provided which includes a fuel tank, a feed conduit through which fuel is pumped from the fuel tank, and a return conduit through which excess fuel is returned to the fuel tank. The fuel tank has first and second sumps separated from each other. The fuel supply system includes an ejector pump having a pressure chamber opening through a throat into the first sump. The pressuer chamber is connected through a communication conduit to the second sump. The ejector pump also includes a fuel nozzle having an inlet port connected to the return conduit and a discharge end opening into the pressure chamber for discharging a jet of fuel into the pressure chamber to create a negative pressure in the pressure chamber so as to suck fuel through the communication conduit from the second sump. The throat has a length and an inner diameter to provide a length-to-diameter ratio ranging from 2 to 8.

BRIEF DESCRIPTION OF THE DRAWINGS

This invention will be described in greater detail by reference to the following description taken in connection with the accompanying drawings, in which like numerals identify like elements in the several figures and in which:

FIG. 17 is a graph used in determining a desired crossing angle for the diffuser element of FIG. 10;

FIG. 19 is a perspective view showing a modified form of the diffuser element;

FIG. 20 is an elevational view of the diffuser element of FIG. 19;

FIGS. 23 to 25 are enlarged sectional views showing other modified form of the fuel nozzle of FIG. 9;

FIG. 26 is a fragmentary sectional view showing still another modified form of the fuel nozzle of FIG. 9;

DETAILED DESCRIPTION OF THE INVENTION

Figure 1:
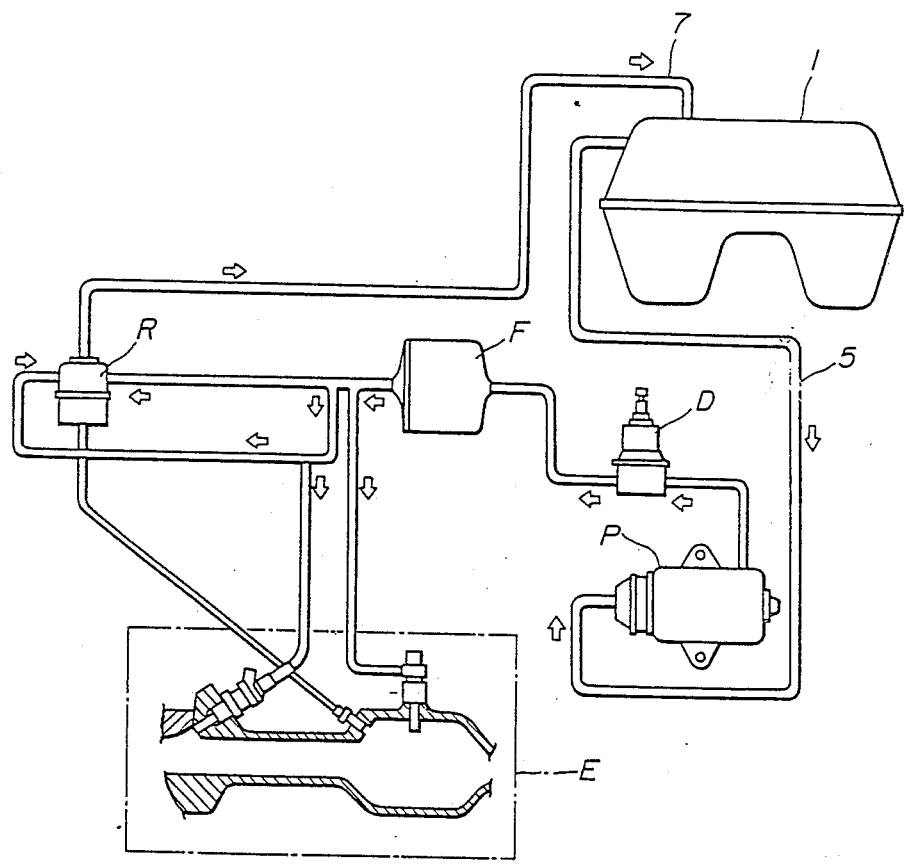
FIG. 1 is a schematic view showing a fuel supply system to which the invention is applicable.

With reference to the drawings, wherein like numerals refer to like parts in the several views, and in particular to FIG. 1, there is illustrated a fuel supply system for use in an internal combustion engine. The fuel supply system comprises a fuel storage tank 1. The fuel tank 1 has a fuel feed conduit 5 connected with the inlet of a fuel pump P driven from the engine E. The outlet from the fuel pump P is connected through a fuel damper D and a fuel filter F to the engine E. A fuel pressure regulator R is connected to the fuel filter F and through an excess return conduit 7 to the fuel tank 1. The pressure regulator R maintains the fuel pressure to the engine at a constant level. This regulation is accomplished by a variation in the amount of excess fuel returned by the regulator R through the excess return conduit 7 to the fuel tank 1.

Figure 2:
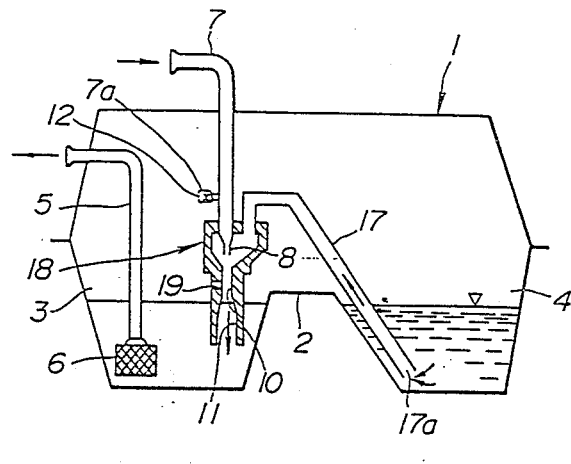
FIG. 2 is a sectional view showing one embodiment of a fuel transfer apparatus made in accordance with the invention.

Referring to FIG. 2, the fuel storage tank 1 has a bottom wall having a portion 2 inwardly projecting to form a recess below the fuel tank 1 for avoiding interference with one or more components positioned in the automotive vehicle. The portion 2 separates the fuel tank 1 into first and second sumps 3 and 4. The fuel feed conduit 5 has a screened inlet 6 located above the bottom of the first sump 3 a distance to permit water and impurities in the first sump 3 to remain there. The excess return conduit 7 has one end terminating in a jet nozzle 8 which constitutes a part of an ejector pump 18. The ejector pump 18 comprises an elongated tubular body 10 having a discharge end opening into the first sump 3.

Figure 3:
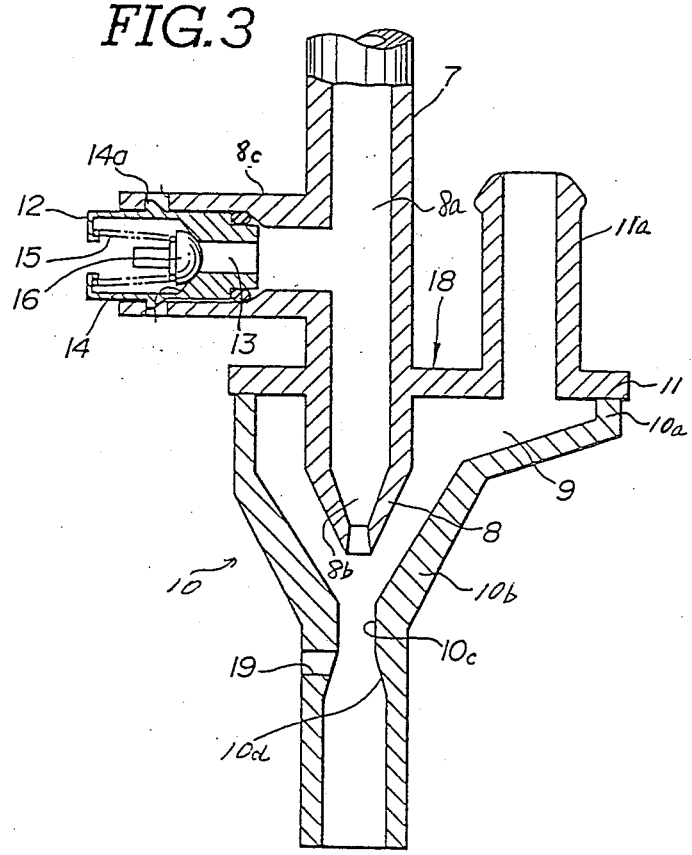
FIG. 3 is a fragmentary enlarged sectional view showing the fuel transfer apparatus of FIG. 2.

As shown in FIG. 3, the tubular body 10 includes an inlet portion 10a, a throat portion 10c smaller in cross-sectional area than the cross-sectional area of the inlet portion 10a, a converging portion 10b between the inlet and throat portions 10a and 10c, and a diverging portion 10d extending away from the throat portion 10c toward its discharge end remote from the inlet portion 10a. The tubular body 10 has an orifice 19 formed therethrough at a height corresponding to the maximum fuel level in the first sump 3. The inlet portion 10a supports a cover plate 11 which defines, along with the converging portion 10b of the tubular body 10, a pressure chamber 9 into which the fuel nozzle 8 opens. The fuel nozzle 8 has an inlet port 8a connected to the return conduit 7 and a bore 8b which is reduced toward its discharge end for discharging a jet of fuel under considerable pressure into the pressure chamber 9 so as to create a negative pressure around the discharge end of the fuel nozzle 8 within the pressure chamber 9. The cover plate 11 is formed with an inlet port 11a for connection with a hose or other conduit. The fuel nozzle 8, the cover plate 11 and the inlet port 11a are preferably integral, as illustrated.

The fuel nozzle 8 is formed with a port 8c connected to the inlet port 8a of the fuel nozzle 8. The port 8c has a relief valve 12 placed therein. The relief valve 12 includes a housing 14 having resilient inclined portions 14a which wedgingly engage the port 8a so that the relief valve 12 is fixed within the port 8a, as illustrated. The housing 14 has an aperture 13 and a plug 16 which closes the aperture 13. A spring 15 is connected at one end to the plug 16 and at its other end to one end of the housing 14. The spring 15 biases the plug 16 to close the aperture 13. The relief valve 12 relieves the fuel pressure within the return passage 7 to the first sump 3 when the fuel pressure exceeds a predetermined value determined by the resilient force of the spring 15.

Returning to FIG. 2, a communication conduit 17 has an inlet 17a located at a short distance above the bottom of the second sump 4 and an outlet connected to the inlet port 11a of the ejector pump 18.

The operation is as follows: When the fuel pump P is driven, fuel is supplied to the engine through the fuel feed conduit 5 from the first sump 3 after the filter 6 removes contaminants in the fuel. The excess fuel is returned from the fuel pressure regulator R through the excess return conduit 7. The returned fuel is discharged through the fuel nozzle 8 in the form of a jet of fuel toward the throat portion 10c so as to create a negative pressure around the fuel nozzle 8 within the pressure chamber 9. The created negative pressure acts to suck fuel through the communication conduit 17 from the second sump 4 into the pressure chamber 9. The sucked fuel is discharged into the first sump 3 along with the fuel jet discharged from the fuel nozzle 8.

It is now assumed that the fuel pressure (back pressure) within the return conduit 7 exceeds a predetermined level due to an increased resistance of fuel flow through the fuel nozzle 8. This condition may occur when the amount of fuel flow through the return conduit 7 increases or the fuel temperature increases to such an extent to vaporize a part of the fuel. The relief valve 12 responds to such a back pressure increase by opening to discharge the fuel from the return conduit 7 into the first sump 3. This is effective to maintain a constant fuel pressure in a fuel injector used in a fuel-injection type engine as shown in FIG. 1 or in a needle valve used in a caburetor type engine. It is, therefore, possible to create an air-fuel mixture of substantially constant air-fuel ratio for the engine so as to ensure smooth engine operation. While the amount of fuel flow through the return conduit 7 differs from one engine to another, the fuel transfer apparatus of the invention is applicable to various types of engine merely by replacing the spring 15 with another one having a resilient force suitable for the engine.

Figure 4:
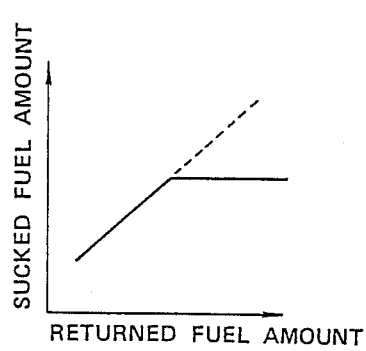
FIGS. 4 and 5 are graphs showing comparative performances of two fuel transfer apparatus, one equipped with a relief valve and one with no relief valve.
Figure 5:
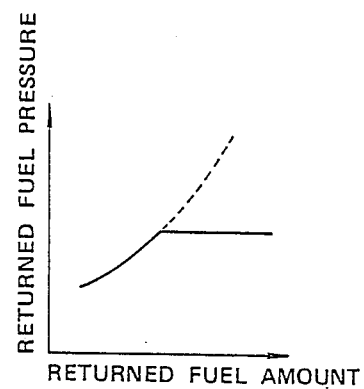

In order to illustrate the effects obtainable by the various features of this embodiment, reference is made to FIGS. 4 and 5. FIG. 4 shows the returned fuel amount versus sucked fuel amount characteristic of the fuel transfer apparatus of the invention. As can be seen from FIG. 4, the amount of fuel sucked or transferred into the pressure chamber 9 through the communication conduit 17 from the second sump 4 reaches a predetermined maximum value when the amount of fuel returned through the return conduit 7 to the fuel nozzle 8 reaches a predetermined value. In FIG. 4, the broken line relates to a similar fuel transfer apparatus with no relief valve. FIG. 5 shows the return fuel amount versus returned fuel pressure characteristic of the fuel transfer apparatus of the invention. As can be seen from FIG. 5, the fuel pressure (back pressure) produced in the return conduit 7 reaches a predetermined maximum value when the amount of fuel returned through the return conduit 7 to the fuel nozzle 8 reaches a predetermined value. In FIG. 5, the broken curve relates to a similar fuel transfer apparatus with no relief valve.

When the fuel nozzle 8 is plugged with foreign matter, the ejecting effect disappears to stop the fuel delivery from the second sump 4 to the first sump 3. However, this condition has no adverse effect on the engine operation since the relief valve 12 opens to permit fuel flow from the return conduit 7 to the first sump 3 when a predetermined back pressure is reached.

Assuming now that the level of fuel in the first sump 3 is lower than the fuel level in the second sump 4 when the fuel pump P stops its pumping operation, fuel is syphoned from the second sump 4 through the communication conduit 17 into the first sump 3 until the fuel level in the first sump 3 is equalized with the fuel level in the second sump 4. If the level of fuel in the first sump 3 is higher than the fuel level in the second sump 4 when the fuel pump P stops its pumping operation, the orifice 19 will prevent fuel from being syphoned from the first sump 3 through the communication conduict 17 into the second samp 4. It is to be understood that the same effect can be obtained without the orifice 19 by locating the discharge end of the tubular body 10 of the ejector pump 18 above the level of fuel in the first sump 3.

Figure 6:
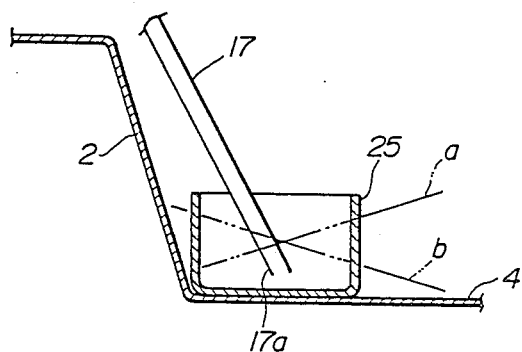
FIG. 6 is a fragmentary enlarged sectional view showing a modified form of the fuel transfer apparatus of the invention.

Referring to FIG. 6, there is illustrated a modified form of the fuel transfer apparatus of the invention. In this modification, an upstanding container 25 having an open upper end is fixed on the bottom of the second sump 4. The inlet 17a of the communication conduit 17 is located above the bottom of the container 25 a distance to permit water and impurities in the container 25 to remain there. This modification is advantageous in that fuel can be transferred from the container 25 to the first sump 3 even when the automotive vehicle makes a swivel motion to incline the level of fuel in the container 25 as indicated by dot and dash line a or b of FIG. 6.

Figure 7:
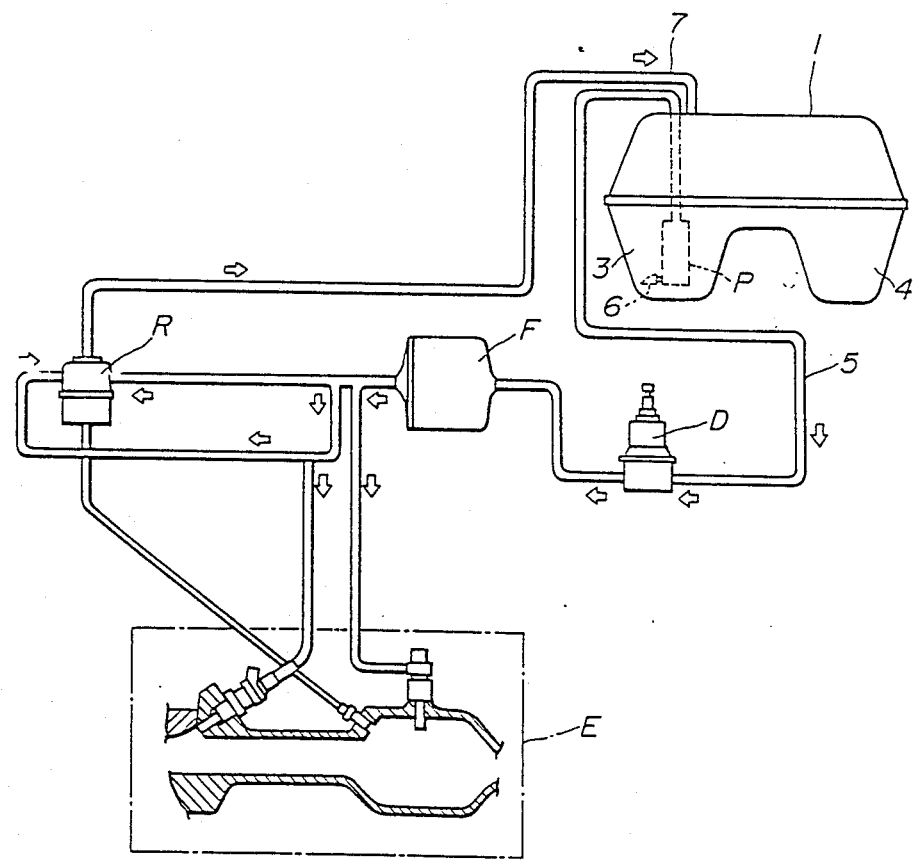
FIG. 7 is a schematic view showing a modified form of the fuel supply system to which the invention is applicable.

While the fuel pump P is located outside the fuel storage tank 1, it is to be noted that the fuel pump P may be located within the first sump 3. In this case, the fuel pump P has a screened inlet 6 located above the bottom of the first sump 3 a distance to permit water and impurities in the first sump 3 to remain there, as shown in FIG. 7.

Figure 8:
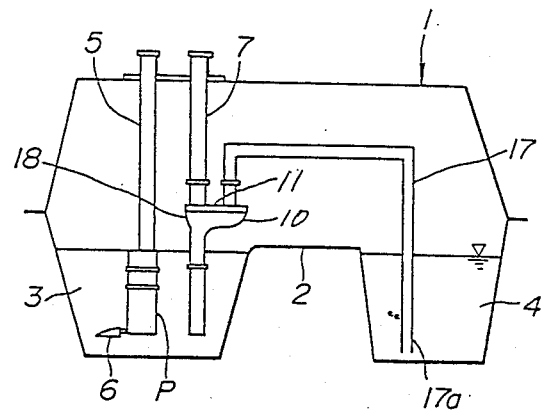
FIG. 8 is a schematic view showing a second embodiment of the fuel transfer apparatus of the invention.

Referring to FIG. 8, there is illustrated a second embodiment of the fuel transfer apparatus of the invention. The fuel transfer apparatus includes a fuel storage tank 1 which has a bottom wall having a portion 2 inwardly projecting to form a recess below the fuel tank 1 for avoiding interference with one or more components positioned in the automotive vehicle. The portion 2 separates the fuel tank 1 into first and second sumps 3 and 4. The fuel feed conduit 5 extends from a fuel pump P having a screened inlet 6 located above the bottom of the first sump 3 a distance to permit water and impurities in the first sump 3 to remain there. The excess return conduit 7 has one end connected to the interior of an ejector pump 18 defined by an elongated tubular body 10 and a cover plate 11. A communication conduit 17 has an inlet 17a located at a short distance above the bottom of the second sump 4 and an outlet connected to the interior of the ejector pump 18.

Figure 9:
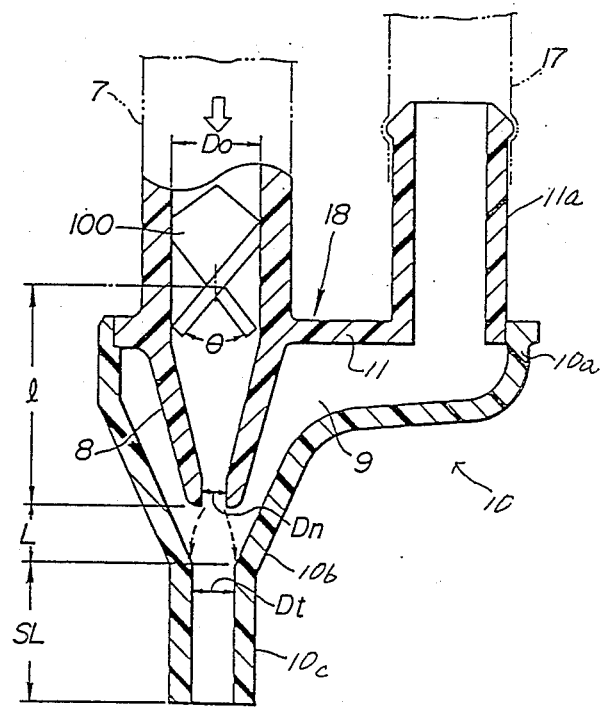
FIG. 9 is a fragmentary enlarged sectional view showing the fuel transfer apparatus of FIG. 8.
Figure 10:
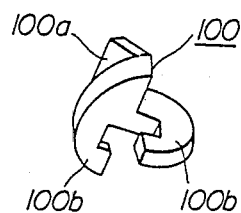
FIG. 10 is a perspective view of the diffuser element positioned in the fuel nozzle of FIG. 9.
Figure 11:
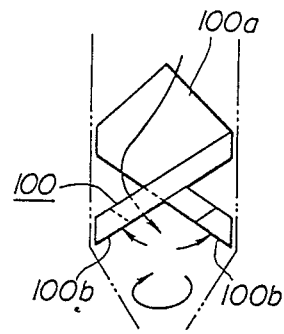
FIG. 11 is an elevational view of the diffuser element of FIG. 10.
Figure 12:
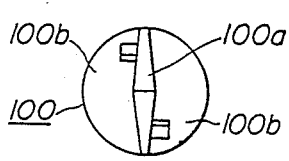
FIG. 12 is a plan view of the diffuser element of FIG. 10.
Figure 15:
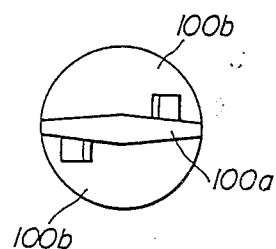
FIG. 15 is a plan view of the diffuser element of FIG. 10.
Figure 13:
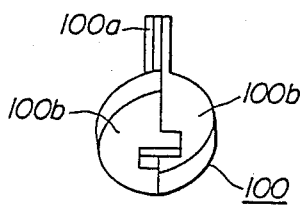
FIG. 13 is a side view of the diffuser element of FIG. 10.
Figure 14:
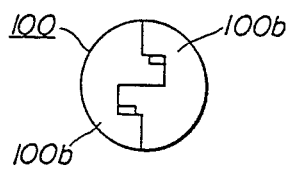
FIG. 14 is a rear elevation of the diffuser element of FIG. 10.
Figure 16:
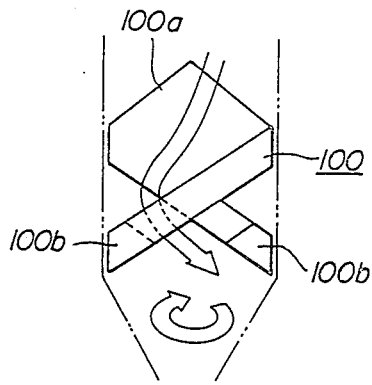
FIG. 16 is an elevational view showing fuel flow through the diffuser element of FIG. 10.

As shown in FIG. 9, the return conduit 7 has one end terminating in a jet nozzle 8 which constitutes a part of an ejector pump 18. The tubular body 10 includes an inlet portion 10a, a throat portion 10c smaller in cross-sectional area than the cross-sectional area of the inlet portion 10a, and a converging portion 10b between the inlet and throat portions 10a and 10c. The throat portion 10c extending away from the converging portion 10b toward its discharge end remote from the inlet portion 10a. If the discharge end of the tubular body 10 is located below the level of fuel in the first sump 3, the tubular body 10 may have an orifice formed therethrough at a height corresponding to the maximum fuel level in the first sump 3 in order to prevent fuel from being syphoned from the first sump 3 through the communication conduit 17 into the second sump 4 when the fuel pump P stops its pumping operation. The inlet portion 10a supports the cover plate 11 which defines, along with the converging portion 10b of the tubular boty 10, a pressure chamber 9 into which the fuel nozzle 8 opens. The fuel nozzle 8 has an inlet port connected to the return conduit 7 and a bore which is reduced toward its discharge end for discharging a jet of fuel under considerable pressure into the pressure chamber 9 so as to create a negative pressure around the discharge end of the fuel nozzle 8 within the pressure chamber 9. The cover plate 11 is formed with an inlet port 11a for connection with the communication conduit 17. The fuel nozzle 8, the cover plate 11, and the inlet port 11a are preferably integral, as illustrated.

The fuel nozzle 8 has a diffuser element 100 placed therein for swirling the fuel flow within the fuel nozzle 8 so as to diffuse the fuel discharged from the discharge end of the fuel nozzle 8. The diffuser element 100 has a structure, shown in FIGS. 10 to 16, having a base portion 100a and a pair of turned wing portions 100b extending from the base portion 100a in different directions and crossing each other at a crossing angle $\theta$. The diffuser element 100 is placed in the fuel nozzle 8 with its base portion 100a being directed away from the discharge end of the fuel nozzle 8. In this position, the diffuser element 100 divides the fuel into two twisted paths, the first path being twisted in one direction to produce a swirled fuel flow toward the discharge end of the fuel nozzle 8. The second path is twisted in another direction to produce a swirled fuel flow toward the discharge end of the fuel nozzle 8. As a result, the fuel discharged from the fuel nozzle 8 is diffused in the form of a cone-shaped fuel jet to cover substantially the whole cross-sectional area of the throat portion 10c of the tubular body 10. This is effective to minimize the loss in utilizing the negative pressure created in the pressure chamber 9 to transfer fuel from the second sump 4 through the communication conduit 17.

In the illustrated embodiment, the ejector pump 18 is designed to have such size relationships as $Do/Dt=1$, $Do/l=0.5$, and $Dn/L=4$, where l is the distance between the center of the diffuser element 100 and the discharge end of the fuel nozzle 8, L is the distance between the discharge end of the fuel nozzle 8 and the inlet end of the throat portion 10c, Dn is the inner diameter of the fuel nozzle 8, Dt is the inner diameter of the throat portion 10c, and Do is the inner diameter of the fuel nozzle inlet where the diffuser element 100 is placed. In order to provide an effective ejecting effect, the ratio Dn/Dt is set in the range of 0.2 to 1.0 and the length SL of the throat portion 10c is set in the range of $2 \times Dt$ to $8 \times Dt$.

A diffuser element having two wing portions crossing at an angle $\theta$ ranging from about 42° to about 135° has proven satisfactory. If the crossing angle $\theta$ is larger than this range, the fuel nozzle discharges fuel at such a great diffusion angle that the discharged fuel collides against the inner surface of the converging portion 10b of the tubular body 10, causing a power loss so as to reduce the ejecting effect. If it is smaller than the range, the fuel nozzle discharges fuel at such a small excessive diffusion angle that the discharged fuel fails to cover the cross-sectional area of the throat portion 10c of the tubular body 10, causing air introduction through the throat portion 10c into the pressure chamber so as to reduce the ejecting effect.

FIG. 17 shows the results of experiments conducted in order to determine a desired crossing angle $\theta$ for the diffuser element 100. The broken curve relates to an ejector pump designed to have a Dn/Dt ratio of 0.5 and supplied with fuel through the return conduit at a flow rate of 20 l/hour. The solid curve relates to an ejector pump designed to have a Dn/Dt ratio of 0.5 and supplied with fuel through the return conduit at a flow rate of 150 l-hour. The one-dotted curve relates to an ejector pump designed to have a Dn/Dt ratio of 0.4 and supplied with fuel through te return conduit at a flow rate of 150 l/hour. The two-dotted curve relates to an ejector pump designed to have a Dn/Dt ratio of 0.8 and supplied with fuel through the return conduit at a flow rate of 150 l/hour. It is to be noted that the rate of fuel flow through the return conduit is about 100 l/hour at engine idling conditions and in the range of 25 to 80 l/hour at vehicle running conditions. The used communication conduit 17 has a suction height H of 300 mm and an inner diameter of 6 mm. In this case, a $-0.06$ kg/cm$^2$ negative pressure was required to suck or transfer fuel through the communication conduit from the second sump 4 into the pressure chamber 9.

As can be seen from a study of FIG. 17, these ejector pumps can produce a sufficient negative pressure when the crossing angle $\theta$ of the diffuser element is in the range from about 42° to about 135°. As indicated by the two-dotted curve, the crossing angle versus negative pressure curve has its peak decreased and shifted to the left, as viewed in FIG. 17, when the radio Dn/Dt is larger than 0.5. As indicated by the one-dotted curve, the crossing angle versus negative pressure curve has a decreased peak when the ratio Dn/Dt is smaller than 0.5. It is, therefore, apparent that an effective ejecting effect can be achieved at a crossing angle $\theta$ smaller than 42° when the ratio Dn/Dt is larger than 0.5.

The operation is as follows: When the fuel pump P is driven, fuel is supplied to the engine E through the fuel feed conduit 5 from the first sump 3 after the filter 6 removes contaminants in the fuel. The excess fuel is returned from the fuel pressure regulator R through the excess return conduit 7. The returned fuel is discharged through the fuel nozzle 8 in the form of a jet of fuel toward the throat portion 10c of the tubular body 10 so as to create a negative pressure around the fuel nozzle 8 within the pressure chamber 9. The created negative pressure acts to suck or transfer fuel through the communication conduit 17 from the second sump 4 into the pressure chamber. Before the fuel is discharged from the fuel nozzle 8, it is swirled by the diffuser element 100 placed in the fuel nozzle 8. As a result, the discharged fuel is diffused in the form of a cone-shape fuel jet which closes the whole cross-sectional area of the throat portion 10c of the tubular body 10. This is effective to achieve a higher ejecting effect. The sucked fuel is discharged into the first sump 3 along with the fuel jet discharged from the fuel nozzle 8.

Assuming now that the level of fuel in the first sump 3 is lower than the fuel level in the second sump 3 when the fuel pump P stops its pumping operation, fuel is syphoned from the second sump 3 through the communication conduit 17 into the first sump 3 until the fuel level in the first sump 3 is equalized with the fuel level in the second sump 4. If the fuel level in the first sump 3 is higher than the fuel level in the second sump 4 when the fuel pump P stops its pumping operation, the orifice formed in the wall of the throat portion 10c will prevent fuel from being syphoned from the first sump 3 through the communication conduit 17 into the second samp 4. It is to be noted that the same effect can be obtained without the orifice by locating the discharge end of the tubular body 10 above the level of fuel in the first sump 3.

Figure 18:
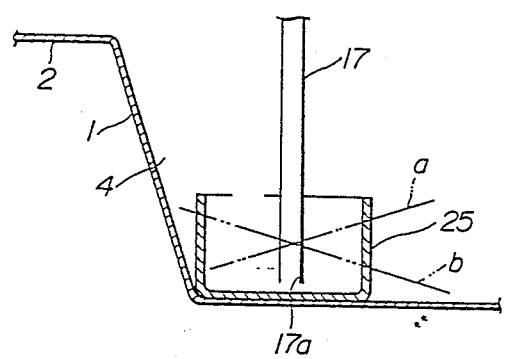
FIG. 18 is a fragmentary enlarged sectional view showing a modified form of the fuel transfer apparatus of FIG. 8.

Referring to FIG. 18, there is illustrated a modified form of the fuel transfer apparatus of the invention. In this modification, an upstanding container 25 having an open upper end is fixed on the bottom of the second sump 4. The inlet 17a of the communication conduit 17 is located above the bottom of the container 25 a distance to permit water and impurities in the container 25 to remain there. This modification is advantageous in that fuel can be transferred from the container 25 to the first sump 3 even when the automotive vehicle makes a swivel motion to incline the level of fuel in the container 25 as indicated by dot and dash line a or b of FIG. 18.

FIGS. 19 and 20 show another form of the diffuser element applicable to the fuel transfer apparatus of the invention to achieve the same effect as described in connection with FIG. 9.

Figure 21:
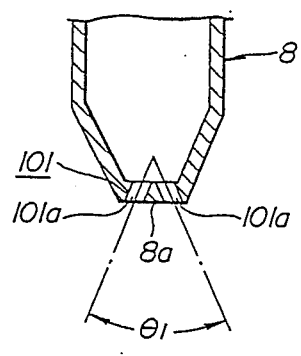
FIG. 21 is a fragmentary sectional view showing a modified form of the fuel nozzle of FIG. 9.
Figure 22:
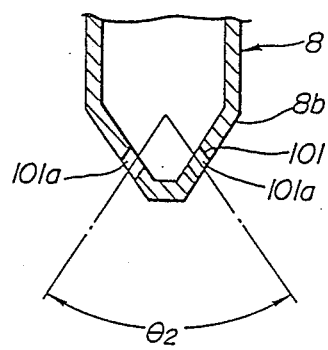
FIG. 22 is a fragmentary sectional view showing another modified form of the fuel nozzle of FIG. 9.

Referring to FIGS. 21 to 26, there are illustrated various modifications of the fuel nozzle 8 for diffusing the discharged fuel in the form of a cone-shaped fuel jet. In the structure of FIG. 21, the fuel nozzle 8 has a flat discharge end wall 101 formed with nozzle holes 101a directed at an angle $\theta 1$ with respect to the axis of the fuel nozzle 8 so as to discharge fuel in the form of a cone having a conical angle of $\theta 1$. In the structure of FIG. 22, the fuel nozzle 8 has a conical discharge end wall 101 formed in its side wall with nozzle holes 101a directed at an angle $\theta 2$ with respect to the axis of the fuel nozzle 8 to discharge fuel in the form of a cone having a conical angle of $\theta 2$. The fuel nozzle 8 may have two openings 101a divided by a partition 101b as shown in FIG. 23, four openings 101a divided by a partition 101b as shown in FIG. 24, or a C-shaped opening 101a as shown in FIG. 25. Alternatively, the fuel nozzle 8 may have a spiral groove formed in the inner surface of the fuel nozzle 8 near its discharge end as shown in FIG. 26. It is to be noted that these modifications may be used solely or in combination with the diffuser element 100.

Figure 27:
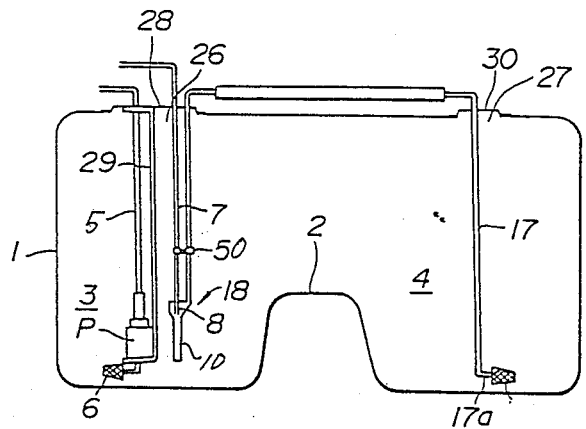
FIG. 27 is a schematic view showing a third embodiment of the fuel transfer apparatus of the invention.

Referring to FIG. 27, there is illustrated a third embodiment of the fuel transfer apparatus of the invention. The fuel storate tank 1 has a bottom wall having a portion 2 inwardly projecting to form a recess below the fuel tank 1 for avoiding interference with one or more components positioned in the automotive vehicle. The portion 2 separates the fuel tank 1 into first and second sumps 3 and 4. The fuel tank 1 has a work aperture 26 formed therein above the first sump 3 and work aperture 27 formed therein above the second sump 4. The work aperture 26 is closed by a lid 28 and the work aperture 27 is closed by a lid 30. The fuel feed conduit 5 extends through the the lid 28 from a fuel pump P having a screened inlet 6 located above the bottom of the first sump 3 a distance to permit water and impurities in the first sump 3 to remain there. The fuel pump P is supported by a support member 29 having one end fixed on the lid 28. The excess return conduit 7 extends through the lid 28 and has one end terminating in a jet nozzle 8 which constitutes a part of an ejector pump 18. The ejector pump 18 is made of an oilproof resin and it comprises an elongated tubular body 10 having a discharge end opening into the first sump 3. A communication conduit 17 has a screened inlet 17a above the bottom of the second sump 4 a distance to permit water and impurityies in the second sump 4 to remain there. The communication conduit 7 extends outward through the lid 30 and extends inward through the lid 28 to the ejector pump 18.

Figure 28:
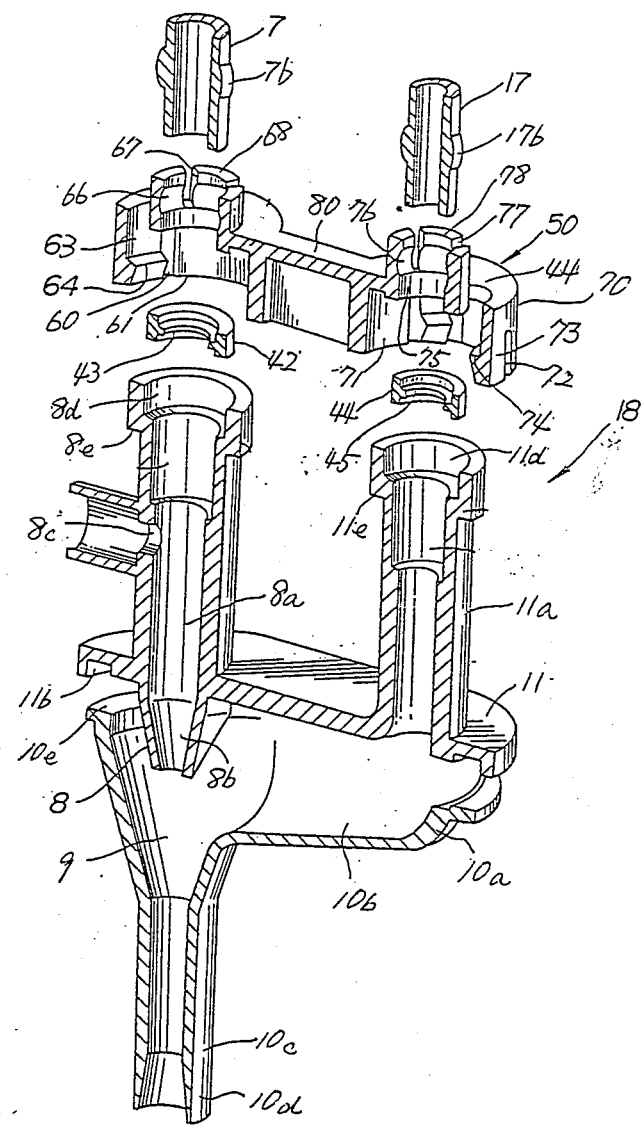
FIG. 28 is an exploded perspective view showing the fuel transfer apparatus of FIG. 27.
Figure 29:
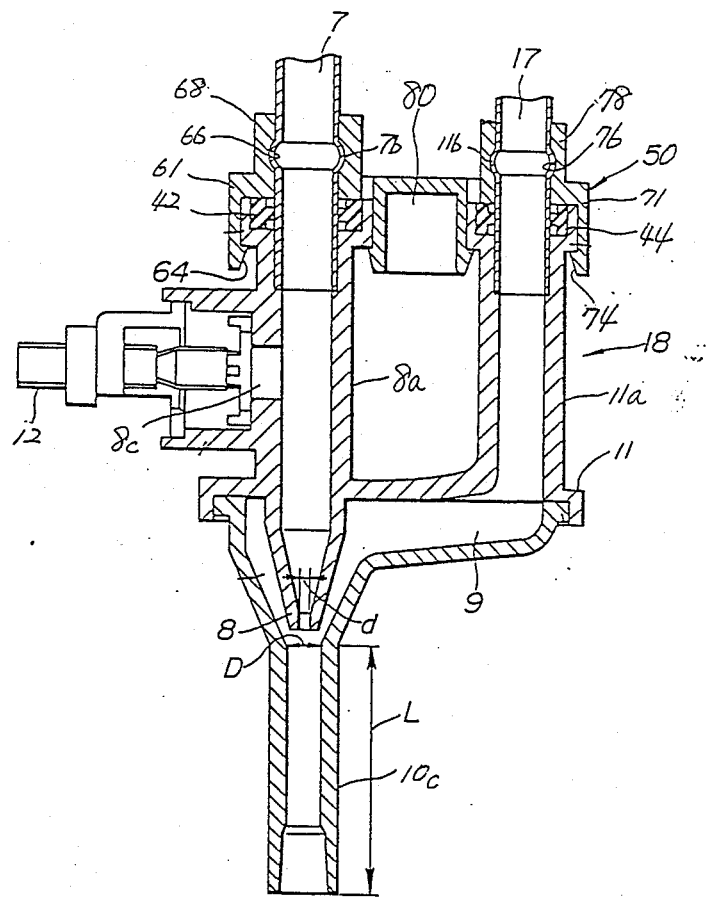
FIG. 29 is a sectinal view of the fuel transfer apparatus of FIG. 27.

As shown in FIGS. 28 and 29, the tubular body 10 includes an inlet portion 10a having a flange 10e, a throat portion 10c smaller in cross-sectional area than the cross sectional area of the inlet portion 10a, a converging portion 10b between the inlet and throat portions 10a and 10c, and a diverging portion 10d extending away from the throat portion 10c toward its discharge end remote from the inlet portion 10a. The inlet portion 10a supports a cover plate 11 having a groove 11b into which the flange 10e fits so that a pressure chamber 9 is defined by the converging portion 10b and the cover plate 11. into which the fuel nozzle 8 opens. The fuel nozzle 8 has an inlet port 8a and a bore 8b which is reduced toward its discharge end for discharging a jet of fuel under considerable pressure into the pressure chamber 9 so as to create a negative pressure around the discharge end of the fuel nozzle 8 within the pressure chamber 9. The fuel nozzle 8 is formed with a port 8c connected to the inlet port 8a of the fuel nozzle 8. The port 8c has a relief valve 12 placed therein. The relief valve 12 opens the port 8c to relieve the fuel pressure within the inlet port 8a to the first sump 3 when the fuel pressure exceeds a predetermined value. The cover plate 11 is formed with an inlet port 11a for connection to the communication conduit 17. The fuel nozzle 8, the inlet port 11a and the cover plate 11 are preferably integral, as illustrated.

Figure 30:
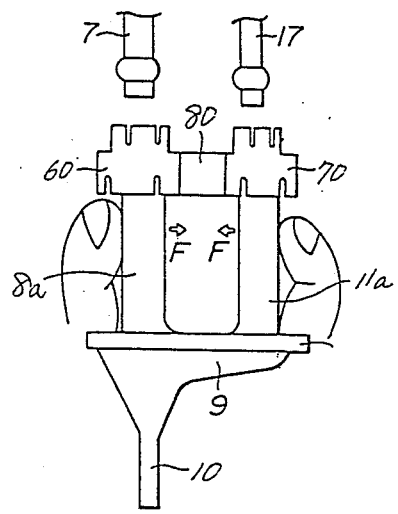
FIG. 30 is a schematic view used in explaining a process of assembling the fuel transfer apparatus of FIG. 27.

The inlet port 8a terminates in an enlarged recess 8d for receipt of a seal ring 42 and the inlet port 11a terminates in an enlarged recess 11d for receipt of a seal ring 44. The seal ring 42 has a annular seal lip 43 formed on its inner surface and the seal ring 44 has an annular seal lip 45 formed on its inner surface. A pipe socket 50 has first and second connectors 60 and 70 and a bridge 80 formed as a unit in a flexible manner between the first and second connectors 60 and 70. The first connector 60 has large- and small-diameter tubular portions 61 and 65. The large-diameter tubular portion 61 has a plurality of slits 62 formed to provide equally spaced notches 63 having a desired degree of flexibilty. Each of the notches 63 is formed at its terminal end with a nail 64 for engagement with the shoulder 8e of the enlarged recess 8d to connect the passage of the small-diameter tubular portion 65 with the inlet port 8a through the seal ring 42. The small-diameter tubular portion 65 has an annular groove 66 formed in its inner surface for engagement with the annular projection 7b formed on the return conduit 7 near its discharge end. The small-diameter tubular portion 65 has a plurality of slits 67 formed to provide equally spaced notches 68 having a desired degree of flexibility for easy insertion of the annular projection 7b into engagement with the annular groove 66. Similarly, the second connector 70 has large- and small-diameter tubular portions 71 and 75. The large-diameter tubular portion 71 has a plurality of slits 72 formed to provide equally spaced notches 73 having a desired degree of flexibility. Each of the notches 73 is formed at its terminal end with a nail 74 for engagement with the shoulder 11e of the enlarged recess 11d to connect the passage of the small-diameter tubular portion 75 with the inlet port 11a through the seal ring 44. The small-diameter tubular portion 75 has an annular groove 76 formed in its inner surface for engagement with the annular projection 11b formed on the communication conduit 17 near its discharge end. The small-diameter tubular portion 75 has a plurality of slits 77 formed to provide equally spaced notches 78 having a desired degree of flexibility for easy insertion of the annular projection 17b into engagement with the annular groove 76. In this structure, the pipe socket 50 connects the inlet ports 8a and 11a to avoid brakage of the inlet ports 8a and 11a due to a force F applied upon connection of the conduits 7 and 17 to the respective inlet ports 8a and 11a, as shown in FIG. 30.

Preferably, the throat ratio L/D of the lenght L of the throat portion 10c to the inner diameter D of the inlet of the throat portion 10c is set in the range from about 2 to about 8. If the throat ratio is smaller than this range, air is introduced through the throat portion 10c into the pressure chamber to reduce the ejecting effect. If it is larger than the range, boiling occurs at the discharge end of the fuel nozzle 8 to vapor a part of the discharged fuel, causing a pressure increase in the pressure chamber 9 to reduce the ejecting effect. This pressure increase may cause a counterflow of fuel from the pressure chamber 9 into the inlet port 11a.

Figure 31:
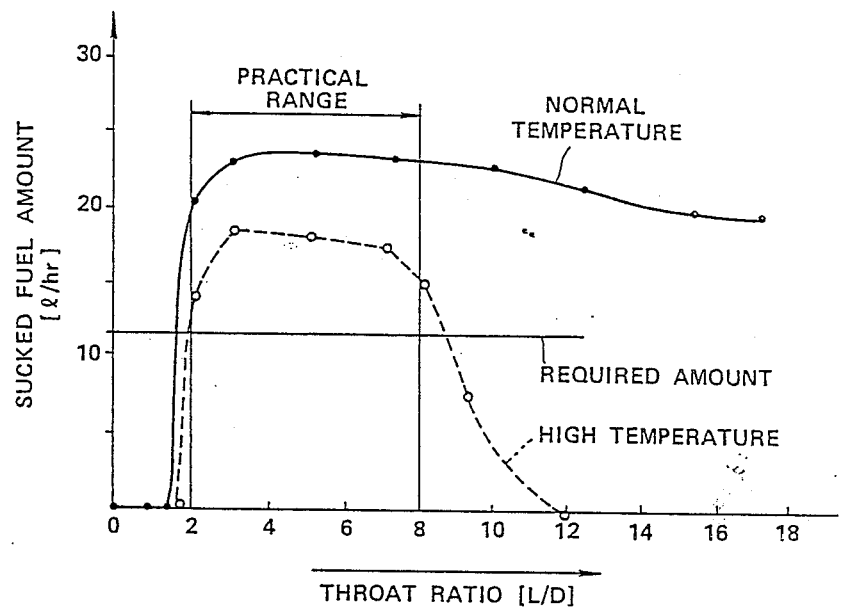
FIG. 31 is a graph used in determining a desired throat ratio for the fuel transfer apparatus of FIG. 27.

FIG. 31 shows the result of experiments conducted in order to determine a desired throat ratio L/D for the throat portion 10c of the tubular body 10. In FIG. 31, the amount of fuel sucked into the pressure chamber 9 through the communication conduit 17 is plotted against throat ratio (L/D). In these experiments, the ratio d/D of the inner diameter d of the fuel nozzle 8 to the inner diameter D of the throat portion 10c was set in the range of from 0.2 to 1.0. The solid curve relates to normal-temperature (20° C.) fuel returned through the return conduit at a flow rate of 80 l/hour. The broken curve relates to high-temperature (60° C.) fuel returned through the return conduit at a flow rate of 80 l/hour. The results show that the fuel transfer apparatus can produce a negative pressure sufficient to suck fuel at a flow rate of 10 l/hour or more regardless of fuel temperature when the throat ratio L/D is in the range from 2 to 8.

The operation is as follows: When the fuel pump P is driven, fuel is supplied to the engine through the fuel feed conduit 5 from the first sump 3 after the filter 6 removes contaminants in the fuel. The excess fuel is returned from the fuel pressure regulator R through the excess return conduit 7. The returned fuel is discharged through the fuel nozzle 8 in the form of a jet of fuel toward the throat portion 10c so as to create a negative pressure around the fuel nozzle 8 within the pressure chamber 9. The created negative pressure acts to suck fuel through the communication conduit 17 from the second sump 4 into the pressure chamber 9. The sucked fuel is discharged into the first sump 3 along with the fuel jet discharged from the fuel nozzle 8. Since the throat ratio L/D is set in the range of 2 to 8, the negative pressure is enough to suck a sufficient amount of fuel through the communication conduit 17 regardless of fuel temperature.

It is now assumed that the fuel pressure (back pressure) within the return conduit 7 exceeds a predetermined level due to an increased resistance of fuel flow through the fuel nozzle 8. This condition may occur when the amount of fuel flow through the return conduit 7 increases or the fuel temperature increases to such an extent to vapor a part of the fuel. The relief valve 12 responds to such a back pressure increase by opening to discharge the fuel from the return conduit 7 into the first sump 3. This is effective to maintain a constant fuel pressure in a fuel injector used in a fuel-injection type engine or in a needle valve used in a caburetor type engine. It is, therefore, possible to create an air-fuel mixture of substantially constant air-fuel ratio for the engine so as to ensure smooth engine operation. While the amount of fuel flow through the return conduit 7 differs from one engine to another, the fuel transfer apparatus of the invention is applicable to various types of engine merely by replacing the relief valve with another one having a characteristic suitable for the engine.

Figure 32:
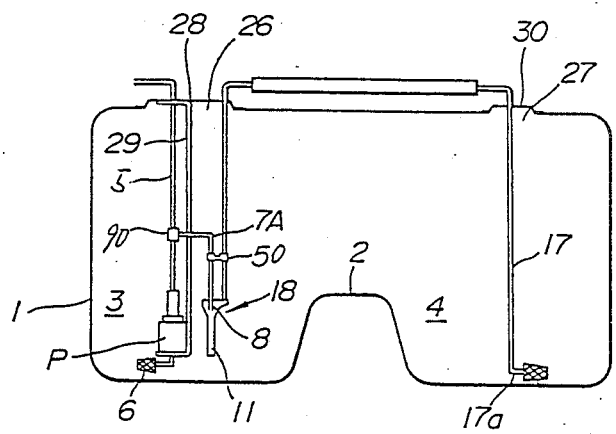
FIG. 32 is a schematic view showing a modified form of the fuel transfer apparatus of FIG. 27.

Referring to FIG. 32, there is illustrated a modification of the fuel transfer apparatus which is different from the structure of FIG. 27 in that the return conduit 7 is connected to the fuel feed conduit 5 through a divergence socket 90.

What is claimed is:

1. A fuel supply system including a fuel tank, a feed conduit through which fuel is pumped from the fuel tank, and a normally open return conduit through which excess fuel is returned to the fuel tank, comprising:

the fuel tank having first and second sumps separated from each other;

an ejector pump having a pressure chamber opening through a throat into the first sump, the pressure chamber being connected through a communication conduit to the second sump, and a fuel nozzle having an inlet port connected to receive a gravitational free fall of fuel through the return conduit and a discharge end opening into the pressure chamber for discharging a jet of fuel into the pressure chamber to create a negative pressure in the pressure chamber so as to suck fuel through the communication conduit from the second sump; and means responsive to a back pressure produced in the fuel nozzle for releasing the back pressure to the first sump when the back pressure exceeds a predetermined value.

2. The fuel supply system as claimed in claim 1, wherein the back pressure relieving means includes a relief valve connected with the inlet port of the fuel nozzle for opening to discharge fuel from the fuel nozzle inlet port to the first sump when the predetermined back pressure value is reached.

3. The fuel supply system as claimed in claim 1, wherein the throat has a length and an inner diameter to provide a length-to-diameter ratio ranging from 2 to 8.

4. The fuel supply system as claimed in claim 1, wherein the ejector pump includes a tubular body having an inlet portion having an upper closed end, a throat portion smaller in cross-sectional area than the cross-sectional area of the inlet portion, and a converging portion between the inlet and throat portions, the coverging portion defining the pressure chamber therein.

5. The fuel supply system as claimed in claim 4, wherein the throat portion has a length and an inner diameter to provide a length-to-diameter ratio ranging from 2 to 8.

6. The fuel supply system as claimed in claim 4, wherein the tubular body has an orifice for preventing fuel from being syphoned from the first sump.

7. The fuel supply system as claimed in claim 1, wherein a container having an upper open end is placed within the second sump having a bottom surface, the container having a bottom fixed on the second sump bottom, the communication conduit terminating at a position a small distance above the container bottom.

8. The fuel supply system as claimed in claim 1, wherein the return conduit is connected to a first outlet of a pressure regulator, the pressure regulator having an inlet connected to the feed conduit and a second outlet connected to an engine, the pressure regulator including means for varying the amount of excess fuel returned through the return conduit to the fuel tank for supplying fuel substantially at a constant pressure through the second outlet to the engine.

9. A fuel supply system including a fuel tank, a feed conduit through which fuel is pumped from the fuel tank, and a normally open return conduit through which excess fuel is returned to the fuel tank, comprising:

the fuel tank having first and second sumps separated from each other;

an ejector pump having a pressure chamber opening through a throat into the first sump, the pressure chamber being connected through a communication conduit to the second sump, and a fuel nozzle having an inlet port connected to receive a gravitational free fall of fuel through the return conduit and a discharge end opening into the pressure chamber for discharging a jet of fuel into the pressure chamber to create a negative pressure in the pressure chamber so as to suck fuel through the communication conduit from the second sump; and means for diffusing the discharged fuel over the cross-sectional area of the throat to prevent air introduction through the throat into the pressure chamber.

10. The fuel supply system as claimed in claim 9, wherein the fuel diffusing means includes a diffuser element placed in the fuel nozzle inlet port, the diffuser element having a pair of wings crossing at a crossing angle with each other to form twisted fuel paths for swirling fuel in the fuel nozzle.

11. The fuel supply system as claimed in claim 10, wherein the crossing angle is smaller than 140°.

12. The fuel supply system as claimed in claim 11, wherein the crossing angle is in a range from 42° to 135°.

13. The fuel supply system as claimed in claim 9, wherein the return conduit is connected to a first outlet of a pressure regulator, the pressure regulator having an inlet connected to the feed conduit and a second outlet connected to an engine, the pressure regulator including means for varying the amount of excess fuel returned through the return conduit to the fuel tank for supplying fuel substantially at a constant pressure through the second outlet to the engine.

14. A fuel supply system including a fuel tank, a feed conduit through which fuel is pumped from the fuel tank, and a normally open return conduit through which excess fuel is returned to the fuel tank, comprising:

the fuel tank having first and second sumps separated from each other; and an ejector pump having a pressure chamber opening through a throat into the first sump, the pressure chamber being connected through a communication conduit to the second sump, and a fuel nozzle having an inlet port connected to receive a gravitational free fall of fuel through the return conduit and discharge holes opening into the pressure chamber at an angle with respect to the axis of the fuel nozzle for discharging fuel in the form of a cone-shape jet into the pressure chamber to create a negative pressure in the pressure chamber so as to suck fuel through the communication conduit from the second sump.

15. The fuel supply system as claimed in claim 14, wherein the return conduit is connected to a first outlet of a pressure regulator, the pressure regulator having an inlet connected to the feed conduit and a second outlet connected to an engine, the pressure regulator including means for varying the amount of excess fuel returned through the return conduit to the fuel tank for supplying fuel substantially at a constant pressure through the second outlet to the engine.

16. A fuel supply system including a fuel tank, a feed conduit through which fuel is pumped from the fuel tank, and a normally open return conduit through which excess fuel is returned to the fuel tank, comprising:

the fuel tank having first and second sumps separated from each other; and an ejector pump having a pressure chamber opening through a throat into the first sump, the pressure chamber being connected through a communication conduit to the second sump, and a fuel nozzle having an inlet port connected to receive a gravitational free fall of fuel through the return conduit and a discharge end opening into the pressure chamber for discharging a jet of fuel into the pressure chamber to create a negative pressure in the pressure chamber so as to suck fuel through the communication conduit from the second sump, the fuel nozzle having an inner surface formed with a swirled groove for swirling fuel in the fuel nozzle.

17. The fuel supply system as claimed in claim 16, wherein the return conduit is connected to a first outlet of a pressure regulator, the pressure regulator having an inlet connected to the feed conduit and a second outlet connected to an engine, the pressure regulator including means for varying the amount of excess fuel returned through the return conduit to the fuel tank for supplying fuel substantially at a constant pressure through the second outlet to the engine.

18. A fuel supply system including a fuel tank, a feed conduit through which fuel is pumped from the fuel tank, and a normally open return conduit through which excess fuel is returned to the fuel tank, comprising:

the fuel tank having first and second sumps separated from each other; and an ejector pump having a pressure chamber opening through a throat into the first sump, the pressure chamber being connected through a communication conduit to the second sump, and a fuel nozzle having an inlet port connected to receive a gravitational free fall of fuel through the return conduit and a discharge end opening into the pressure chamber for discharging a jet of fuel into the pressure chamber to create a negative pressure in the pressure chamber so as to suck fuel through the communication conduit from the second sump, the throat having a length and an inner diameter to provide a length-to-diameter ratio ranging from 2 to 8.

19. The fuel supply system as claimed in claim 18, wherein the return conduit is connected to a first outlet of a pressure regulator, the pressure regulator having an inlet connected to the feed conduit and a second outlet connected to an engine, the pressure regulator including means for varying the amount of excess fuel returned through the return conduit to the fuel tank for supplying fuel substantially at a constant pressure through the second outlet to the engine.

* * * * *